Figure 1:
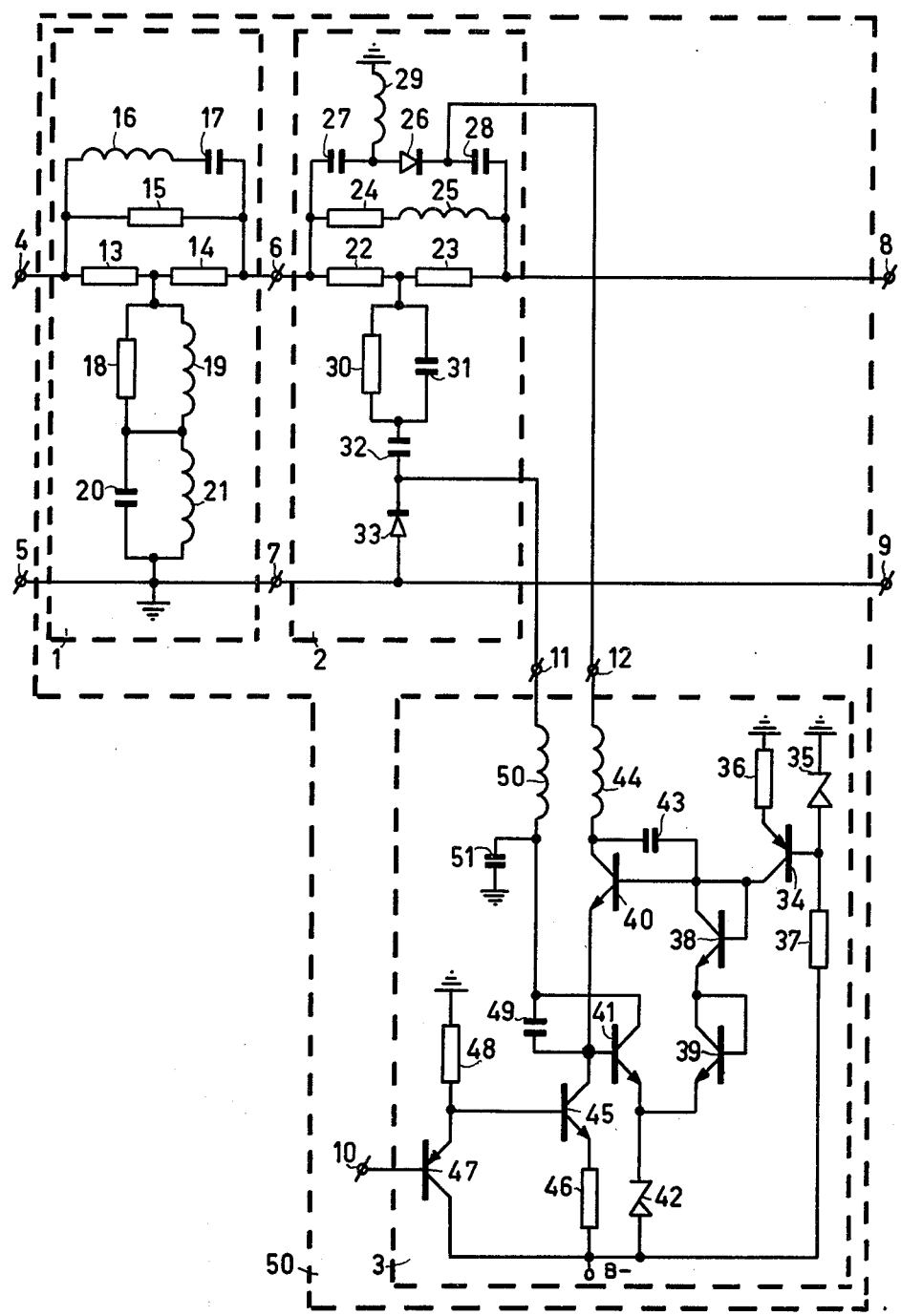

United States Patent [19]

van der Meijs

[11] 4,208,640
[45] Jun. 17, 1980

[54] ATTENUATION EQUALIZER FOR CORRECTING A TEMPERATURE AND FREQUENCY-DEPENDENT CABLE ATTENUATION

[75] Inventor: Antonius A. E. J. van der Meijs, Breda, Netherlands

[73] Assignee: U.S. Philips Corporation, New York, N.Y.

[21] Appl. No.: 914,853

[22] Filed: Jun. 12, 1978

[30] Foreign Application Priority Data

Jul. 7, 1977 [NL] Netherlands .................... 7707542

[51] Int. Cl.² .............................................. H03H 7/16
[52] U.S. Cl. ................................... 333/18; 178/63 E; 333/28 R
[58] Field of Search ............. 333/18, 28 R; 178/63 E; 325/65

[56] References Cited

U.S. PATENT DOCUMENTS

| | | | |
|---|---|---|---|
| 2,777,994 | 1/1957 | Hurault | 333/28 R X |
| 3,441,879 | 4/1969 | Tomcavage | 333/28 R |
| 3,569,869 | 3/1971 | Sutton, Jr. et al. | 333/28 R X |
| 3,854,659 | 12/1974 | Bucherl et al. | 333/28 R |

FOREIGN PATENT DOCUMENTS 2453609  5/1975  Fed. Rep. of Germany ........ 333/28 R Primary Examiner—Paul L. Gensler
Attorney, Agent, or Firm—Thomas A. Briody; William J. Streeter; Simon L. Cohen

[57] ABSTRACT

Attenuation equalizer for correcting within a frequency range the temperature and frequency-depending attenuation variation of cables, comprising a cascade arrangement of a fixed and a variable attenuation correction circuit, connected to a control circuit, the variable attenuation correction circuit comprising a bridge-T network having a series arrangement, of two identical series resistors bridged by a variable bridging impedance and a parallel impedance connected between these two series resistors, the fixed attenuation correction circuit having a lower attenuation for higher frequencies than for lower frequencies, the temperature dependency of the cable being eliminated in the variable attenuation correction circuit and the frequency dependence being eliminated mainly in the fixed attenuation correction circuit for which purpose the variable attenuation correction circuit comprises only two adjustable components.

3 Claims, 2 Drawing Figures

ATTENUATION EQUALIZER FOR CORRECTING A TEMPERATURE AND FREQUENCY-DEPENDENT CABLE ATTENUATION

The invention relates to an attenuation equalizer for correcting within a frequency range the temperature and frequency-dependent attenuation variations of cables, comprising a cascade arrangement of a fixed and an adjustable attenuation correction circuit, the adjustable attenuation correction circuit being connected to a control circuit and comprising a bridged -T network having a series arrangement of two identical series resistors bridged by an adjustable series impedance and having a parallel impedance connected between the two series resistors, the fixed attenuation correction circuit having a lower attenuation for higher frequencies than for lower frequencies.

Such an attenuation equalizer is realized in the Magnavox trunk amplifier 4-T300, as described in "instruction manual" MX 404-series, pages 91, 129.

With signal transmission over cables a frequency-depending attenuation occurs, higher signal frequencies being attenuated by the cable to a greater extent than lower signal frequencies. Furthermore, an apparent increase or decrease in cable length occurs when the temperature of the cable increases or decreases, in a given proportionality to the temperature variation which is expressed in the temperature coefficient of the cable. At a higher cable temperature the cable attenuation varies to a greater degree with the same frequency variation than at a lower cable temperature, in other words the frequency-dependency of the cable attenuation is higher at higher cable temperatures than at lower cable temperatures.

The known attenuation equalizer is used to restore a signal transmitted over a cable within a frequency range of 40 to 300 MHz at different cable temperatures within minimum and maximum cable temperatures occurring in operation, to its original equal signal amplitude level. A frequency-independent amplification of the signal is effected in an amplifier connected in cascade with the attenuation equalizer.

By means of the fixed attenuation correction circuit of the attenuation equalizer the cable attenuation variation is compensated for each temperature with a frequency-dependent attenuation variation and adapted to the control range of the adjustable attenuation correction circuit. With a frequency-dependent attenuation circuit the frequency-dependency of the cable attenuation, being different for each temperature, is minimized for each temperature by means of the adjustable attenuation correction circuit and in a frequency-independent attenuation circuit the frequency-independent attenuation levels, which are different at different temperatures, are compensated to an attenuation level which is the same for each temperature and frequency.

Both attenuation circuits are implemented as bridged-T networks, each of them comprising in the bridge of the series branch as well as in the parallel branch an adjustable PIN-diode as a control resistor. To obtain a correct value relation between these 4 PIN-diodes at each cable temperature a complicated control circuit is required.

It is an object of the invention to provide an attenuation equalizer in which the number of elements to be adjusted is smaller than with the state-of-the-art attenuation equalizer, so that a cost effective production is possible and, furthermore, a simple control circuit is sufficient.

An attenuation equalizer of the type according to the invention, defined in the preamble is therefore characterized in that the value of the bridging impedance at higher temperatures is smaller and the value of the parallel impedance is greater than at lower temperatures to obtain for one and the same frequency variation an attenuation variation of the adjustable attenuation correction circuit which is greater at lower temperatures than at higher temperatures, the bridging impedance being inductive and the parallel impedance being capacitive in said frequency range and the attenuation difference of the fixed attenuation correction circuit being at least substantially equal to the sum of the attenuation difference of the cable, ensuing at the maximum cable temperature occurring in operation and the attenuation difference of the adjustable attenuation correction circuit, then occurring.

Application of these measures according to the invention enables the simulation in the adjustable attenuation correction circuit of the attenuation of a cable having a negative temperature coefficient.

The temperature-dependent apparent length variation of a cable connected to the attenuation equalizer is compensated for in the adjustable attenuation correction circuit, which simulates a similar cable having the same, but opposite temperature-dependent length variation, to a given length which is equal for each cable temperature occurring in operation. To this end it is sufficient that only the parallel and the bridging impedances are implemented in an adjustable manner. The control circuit required for adjusting these impedances can therefore be simple.

Whereas the elimination of the temperature-dependency of the cable attenuation is effected in the adjustable attenuation correction circuit, the elimination of the frequency-dependency of the cable attenuation is effected in the fixed attenuation correction circuit.

Both attenuation correction circuits are linear circuits so that the circuit sequence of these attenuation correction circuits is not important for the functioning of the attenuation equalizer according to the invention.

A preferred embodiment of an attenuation equalizer according to the invention, in which the product of the impedance values of the bridging and the parallel impedances is at least substantially equal to the square of the resistance value of the two series resistors, is characterized in that the bridging impedance comprises a series arrangement of a first resistor and an inductance, bridged by a first control resistor, and the parallel impedance of a second control resistor connected in series with a parallel arrangement of a second resistor and a capacitance, the value of the first control resistor being smaller and of the second control resistor being greater at higher temperatures than at lower temperatures.

By applying these measures a constant overall flat attenuation characteristic is achieved in a simple manner, for each temperature within the minimum and maximum cable temperatures occurring in operation, at a constant input and output impedance of the variable attenuation correction circuit.

For a correct equalization of the cable attenuation variation the attenuation to be added in the variable attenuation correction circuit should have a frequency-dependent variation corresponding to the frequency-depending attenuation variation characteristic for the type of the relevant cable. Starting from a cable whose temperature coefficient is, for example, 0.2%/°C. and the apparent length varies between 100 m and 116 m at temperatures varying between, for example, −20° C. and 60° C., the cable is then apparently extended to a length of 120 m for any cable temperature between −20° C. and 60° C. when the minimum attenuation of the variable attenuation correction circuit corresponds to, for example, 4 m cable length. The fixed attenuation correction circuit must then have a frequency-dependent attenuation variation which is opposite to that of the relevant cable of a length of 120 m.

An attenuation variation of the variable attenuation correction circuit corresponding to that of the characteristc attenuation of the relevant type of cable can be realized by a proper choice of the mutual values of the first and second resistor, first and second control resistor, inductance and capacitance, incorporated in the above-mentioned preferred embodiment.

In practice the variable and the fixed attenuation correction circuit according to the invention also introduces a frequency-independent residual attenuation which is, however, not relevant for the equalization of the cable attenuation.

A further preferred embodiment of an attenuation equalizer according to the invention, whose first and second control resistor comprise first and second PIN-diodes respectively, is characterized in that the control circuit comprises a control input, first and second control outputs each being connected to one of both PIN-diodes. An adjustable current is connected to the control input, as well as a series arrangement of first and second pn-semiconductor junctions connected to a fixed current source. The series arrangement is arranged in parallel with the series-arranged base-emitter junctions of first and second transistors whose collectors are connected to the first and the second control outputs respectively. The adjustable current source is connected to both the emitter of the first transistor and the base of the second transistor.

The use of this measure results in a control circuit wherein the product of the currents at the first and the second control output remains constant, while the mutual value of these currents can be adjusted by means of a control signal at the control input. In this way a constant product of the resistance values of the first and second PIN-diodes, functioning as control resistors, is guaranteed, so that the input and the output impedance of the variable attenuation correction circuit has the same value at any setting of the resistance values of the PIN-diodes.

The invention will be further explained by way of non-limitative example with reference to the Figures shown in the drawing.

Herein:

FIG. 1 shows a practical embodiment of an attenuation equalizer according to the invention.

Figure 2:
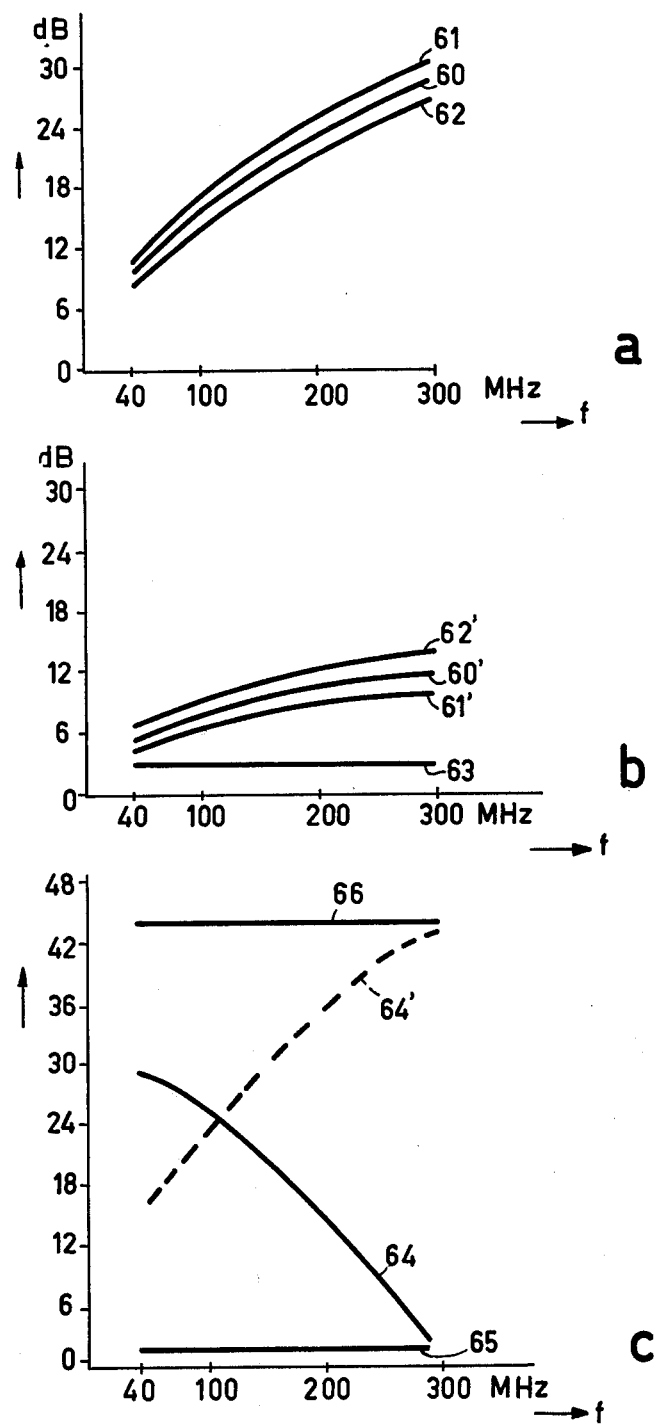

FIGS. 2a to 2c inclusive show attenuation characteristics of a cable, a variable attenuation correction circuit and a fixed attenuation correction circuit respectively, as well as the total frequency-independent attenuation level of the equalizer according to the invention and the cable.

FIG. 1 shows an attenuation equalizer 50 comprising input terminals 4, 5 and output terminals 8, 9. The attenuation equalizer 50 comprises a fixed attenuation correction circuit 1, connected in cascade with a variable attenuation correction circuit 2 via terminals 6, 7. The variable attenuation correction circuit 2 is connected to first and second control outputs 11 and 12 of a control circuit 3.

The fixed attenuation correction circuit 1 comprises a bridged-T network having in the series branch between the input terminal 4 and the terminal 6 two series-arranged identical resistors 13 and 14 bridged by a fixed bridging impedance comprising a parallel arrangement of a series resonant circuit 16, 17 and a resistor 15. In the parallel branch the fixed attenuation compensator circuit has a fixed parallel impedance comprising a parallel arrangement of a resistor 18 and an inductance 19 arranged in series with a parallel resonant circuit 20, 21. One end of the series branch is connected between the two resistors 13 and 14 and the other end to the input terminal 5, which is connected to ground.

The variable attenuation correction circuit 2 also comprises a bridged-T network having in the series branch betweem the terminal 6 and the output terminal 8 two series-arranged identical resistors 22 and 23, bridged by a variable bridging impedance comprising a series arrangement of an inductance 25 and a first resistor 24, the series arrangement being arranged in parallel to a first PIN diode 26 which functions as a first control resistor. Diode 26 has in the anode and the cathode lead respective d.c. blocking capacitors 27 and 28. The anode of the first PIN diode 26 is also connected to ground via an HF blocking inductance 29 and the cathode is connected to the second control output 12 of the control circuit 3. The parallel branch of the variable attenuation correction circuit 2 comprises a variable parallel impedance provided with a parallel arrangement of a second resistor 30 and a capacitor 31, this parallel arrangement being arranged in series with a d.c. blocking capacitor 32 and a second PIN diode 33 which functions as the second control resistor. The anode of the second PIN diode 33 is connected to ground, while the cathode is connected to the first control output 11 of the control circuit 3.

The resonant frequencies of the series resonant circuit 16, 17 and the parallel resonant circuit 20, 21 of the fixed attenuation correction circuit 1 are higher than the maximum signal frequency in the frequency range of the signal applied via a cable to the input terminal 4. This frequency range may, for example, be between 40 and 300 MHz. In this frequency range the series resonant circuit 16, 17 is of a capacitive and the parallel resonant circuit 20, 21 of an inductive character, which manifests itself in a high attenuation for the lower signal frequencies and a low attenuation for the higher signal frequencies. A proper rating of the values of the elements of the bridging and the parallel impedances results in a desired attenuation variation which, as regards the frequency dependency, should be opposite to the sum of the cable attenuation variation at the highest prevailing cable temperature and the attenuation variation of the variable attenuation correction circuit 2 occurring at this cable temperature and in an input and output impedance which is equal for any signal frequency which corresponds to the resistance value of each of the resistors 13 and 14.

The bridging and parallel impedance respectively of the variable attenuation correction circuit 2 is, on the contrary, inductive and capacitive, respectively, in said frequency range for any value of the first and the second PIN diode. For any setting of the two PIN diodes this results in a higher attenuation for the higher signal frequencies and a lower attenuation for the lowest signal frequencies, so that cable attenuations can be simulated with this variable attenuation correction circuit. The frequency dependency of the attenuation variation of the variable attenuation correction circuit 2 increases when the first PIN diode 26 is adjusted to a higher resistance value, and decreases when the diode 26 is adjusted to a lower value. The frequency dependence of the circuit 2 increases when the second PIN diode 33 is adjusted to a lower resistance value and decreases when the diode 33 is adjusted to a higher resistance value. To maintain a constant input and output impedance of this attenuation correction circuit the product of the impedance values of the bridging and the parallel impedance should remain equal to the square of the resistance value of each of the two resistors 22 and 23. So a decrease in the resistance value of the first PIN diode 26 must be accompanied by an increase in the resistance value of the second PIN diode 33 and vice versa.

By a proper rating of the elements 24 and 25 of the bridging impedance and of the elements 30 and 31 of the parallel impedance as well as of the control currents for the PIN diodes 26 and 33, attenuation variations are obtained within this current control range, which correspond to those of a cable of the cable type connected to the input terminal 4 for lengths within a given length-variation range.

At higher cable temperatures at which the cable length is apparently longer, the variable attenuation correction circuit 2 should be adjusted to an attenuation variation corresponding to a shorter cable length than at lower cable temperatures, at which the cable length seems to be shorter. The attenuation correction circuit 2 simulates a cable having a negative temperature coefficient.

In practice the minimum attenuation of the variable attenuation correction circuit 2 with a still cable-like variation corresponds, to the attenuation of the cable, connected to the input terminal 4, at a given minimum length. Consequently, also at the maximum cable temperature, a given, minimum attenuation of the variable attenuation correction circuit 2, is added to the cable attenuation.

Besides this minimum, still cable-like attenuation the variable attenuation correction circuit 2 also introduces a residual attenuation which is equal and frequency-independent at each setting of the PIN diodes 26 and 33. For the equalization of the cable attenuation variation this residual attenuation is of no importance.

The cascade arrangement shown in the drawing on the one hand effects the elimination of the temperature dependency of the cable attenuation in the variable attenuation correction circuit, and on the other hand effects the elimination of the frequency dependency of the cable attenuation in the fixed attenuation correction circuit 1, at least for the greater part. A correct equalization of the cable attenuation variation occurs with an attenuation variation of the fixed attenuation correction circuit 1 as mentioned above. The frequency-independent residual attenuation also introduced by this fixed attenuation correction circuit 1 is of no importance for said equalization.

The control currents for the PIN diodes 26 and 33 are supplied by the control circuit 3 via the second and first control output 12 and 11 respectively.

The control circuit 3 comprises a control input 10 which is connected to the base of a transistor 47. This transistor 47 is connected by means of its collector to a supply line and by means of its emitter via a resistor 48 to ground. The emitter is also connected to the base of a transistor 45. This transistor 45 is connected by means of its emitter via a resistor 46 to the supply line and by means of its collector to the base of a transistor 41, the emitter of a second transistor 40 and, via a series arrangement of a decoupling capacitor 49 and a HF blocking inductance 50, to the first control output 11. The junction between the decoupling capacitor 49 and the blocking inductance 50 is connected via a HF short-circuiting capacitor 51 to ground and also to the collector of the first transistor 41. The collector of the second transistor 40 is connected via a HF blocking inductance 44 to the second control output 12 and, via a decoupling capacitor 43, to its base, this base being connected to the collector of a transistor 34 and to both the base and the collector of a transistor 38. This transistor 38 is connected by means of its emitter to both the base and the collector of a transistor 39. The emitters of the transistors 41 and 39 are both interconnected and connected to the supply line via a Zener diode 42, arranged in the inverse direction. The transistor 34 is connected by means of its emitter to ground via a resistor 36 and by means of its base to ground via a zener diode 35 as well as to the supply line via a resistor 37.

The transistor 34 which functions as a fixed current source supplies a collector current $I_o$, the value of which is determined by the value of the resistor 36.

For transistors which are assumed to be ideal, the collector-emitter current varies exponentially versus the base-emitter voltage.

In the control circuit 3 the sum of the base-emitter voltages of the transistors 40 and 41 is equal to the sum of the base-emitter voltages of the transistors 38 and 39.

If it is assumed that the transistors 38–41 are identical and ideal, i.e. that their collector currents vary exponentially with their base-emitter voltages, the product of the collector-emitter currents of the transistors 40 and 41, being the second and first control current respectively, will be equal to the product of the collector-emitter currents of the transistors 38 and 39, being $I_o^2$. So, if the first control current at the first control output increases, the second control current at the second control output decreases and vice versa. The second control current, that is to say the collector-emitter current of the transistor 40 can be varied by means of a variable current source consisting of components 47, 48, 45 and 46 and, simultaneously, the first control current, that is to say the collector-emitter current of the transistor 41.

A temperature-dependent control voltage supplied to the input 10 also appears at the emitter of the transistor 45 and determines the value of the second control current by means of the value of the resistor 46.

In a practical embodiment the resistor 36 is implemented as a potentiometer to be able to control also the collector current $I_o$ of the transistor 34, which may be advantageous for adapting the attenuation equalizer to different kinds and lengths of cables. The components of an attenuation equalizer and an associated control circuit according to the invention may have in practice the following values:

| Resistors | Values | Capacitors | Values (F) | Inductances | Values (H) |
|---|---|---|---|---|---|
| 13,14, 22,23, 24,30 | 75Ω | 27,28 32,49, 51 | 10n | 29,44,50 | 5μ |
| 15 | 280Ω | 17 | 8p2 | | |
| 18 | 20Ω | 20 | 5p6 | | |

| Resistors | Values | Capacitors | Values (F) | Inductances | Values (H) |
|---|---|---|---|---|---|
| 36 | 24kΩ 34kΩ | 31 | 22p | | |
| 37 | 15kΩ | 43 | 4n7 | | |
| 46 | 820Ω | | | | |
| 48 | 18kΩ | | | | |

The RCA integrated circuit CA 3046 is used for the transistors 40, 41, 45, 38 and 39.

The PIN diodes 26 and 33 are of the type IN5957 and the zener diodes 35 and 42 of the type BZY 79, and the type BZX79 respectively. The inductances 25 and 19 respectively are formed by winding 0.63 mm thick copper wire 4½ turns around a core of 5 mm and 4½ mm diameter respectively. The inductances 16 and 21 respectively are formed by winding 0.5 mm thick copper wire 1½ and 2½ turns respectively around a core of 3 and 2½ mm diameter respectively.

FIG. 2a shows the attenuation variation of a cable at a cable temperature of 20° C. by means of a curve 60, at a cable temperature of 60° C. by means of a curve 61 and at a cable temperature of −20° C. by means of a curve 62.

FIG. 2b shows by means of a curve 60' the required cable-like attenuation variation of a variable attenuation correction circuit according to the invention at a cable temperature of 20° C., by means of a curve 61' at a cable temperature of 60° C. and by means of a curve 62' at a cable temperature of −20° C. Curve 63 shows the residual attenuation of the variable attenuation correction circuit.

FIG. 2c shows by means of a curve 64 the required attenuation variation of a fixed attenuation correction circuit. A curve 64' represents the sum of the attenuation variations in accordance with curves 60 and 60', which is equal to the sum of the attenuation variations according to the curves 61 and 61' and that according to the curves 62 and 62'.

As regards its frequency dependency curve 64 is the opposite of the curve 64' so that, when adding the attenuations according to these curves, a flat attenuation variation according to a curve 66 is obtained. The frequency-independent residual attenuation of the fixed attenuation correction circuit is shown by means of a curve 65 and is of no importance for the equalization of the different cable attenuation variations, which also applies to the residual attenuation of the variable attenuation correction circuit.

What is claimed is:

1. An attenuation equalizer for correcting within a frequency range the temperature and frequency-dependent attenuation variation of cables, comprising a fixed attenuation correction circuit an adjustable attenuation correction circuit connected in cascade with the fixed attenuation correction circuit, and a control circuit connected to said adjustable attenuation correction circuit and including a means for receiving a temperature variable electrical signal, said adjustable attenuation circuit comprising a bridged-T network having a series arrangement of two identical series resistors bridged by an adjustable series impedance and a parallel impedance connected between these two series resistors, the fixed attenuation correction circuit having for higher frequencies a lower attenuation than for lower frequencies, the value of the bridging impedance at higher temperatures is smaller and the value of the parallel impedance is greater than at lower temperatures in order to obtain for one and the same frequency variation an attenuation variation of the variable attenuation correction circuit which is greater at lower temperatures than at higher temperatures, the bridging impedance being inductive and the parallel impedance capacitive in said frequency range, and the difference between the attenuation of the fixed attenuation correction circuit at the extremes of its frequency range being at least substantially equal to the sum of the difference of the attenuation of the cable measured at the maximum cable temperature and any given operating temperature and the difference of the attenuation of the variable attenuation correction circuit measured at the minimum cable operating temperature and said given operating temperature.

2. An attenuation equalizer as claimed in claim 1, in which the product of the impedance values of the bridging impedance and the parallel impedance is at least substantially equal to the square of the resistance value of the two series resistors, characterized in that the bridging impedance comprises a series arrangement of a first resistor and an inductance being bridged by a first control resistor and the parallel impedance is a second control resistor arranged in series with a parallel arrangement of a second resistor and a capacitance, the value of the first control resistor being smaller and the value of the second control resistor being greater at higher temperatures than at lower temperatures.

3. An attenuation equalizer as claimed in claim 2, the first and the second control resistor of which comprise first and second PIN-diodes respectively, characterized in that the control circuit comprises a control input, a first control output connected to the second PIN-diode and a second control output connected to the first PIN-diode, an adjustable current source connected to the control input as well as a series arrangement of first and second pn-semiconductor junctions being connected to a fixed current source, the series arrangement being arranged in parallel with the series-arranged base-emitter junctions of first and second transistors whose respective collectors are connected to the first and the second control output and wherein the adjustable current source is connected to both the emitter of the first transistor and the base of the second transistor.

* * * * *